United States Patent
Bennett et al.

(10) Patent No.: US 7,627,524 B2
(45) Date of Patent: Dec. 1, 2009

(54) SYSTEM, METHOD, AND COMPUTER PROGRAM PRODUCT FOR RECEIVING AND PROCESSING PAYMENTS

(75) Inventors: Jim Bennett, Tulsa, OK (US); Tim Neece, Sperry, OK (US); Jamie Thompson, Owasso, OK (US)

(73) Assignee: U.S. Payments, LLC, Tulsa, OK (US)

( * ) Notice: Subject to any disclaimer, the term of this patent is extended or adjusted under 35 U.S.C. 154(b) by 37 days.

(21) Appl. No.: 11/321,654

(22) Filed: Dec. 29, 2005

(65) Prior Publication Data

US 2006/0173779 A1    Aug. 3, 2006

Related U.S. Application Data

(60) Provisional application No. 60/640,923, filed on Dec. 31, 2004.

(51) Int. Cl.
G06Q 40/00  (2006.01)
(52) U.S. Cl. ............... 705/39; 705/35; 705/40
(58) Field of Classification Search ............ 705/35, 705/39, 40
See application file for complete search history.

(56) References Cited

U.S. PATENT DOCUMENTS

2004/0019559 A1*  1/2004  Moenickheim et al. ....... 705/40
2005/0033690 A1*  2/2005  Antognini et al. ............. 705/40
2005/0184146 A1*  8/2005  Hoch .......................... 235/380

OTHER PUBLICATIONS

CheckFree Says It's Finding Its Stride in Walk-In Bill-Pay Daniel Wolfe. American Banker. New York, N.Y.: Oct. 21, 2004. vol. 169, Iss. 203; p. 12.*
BP to Roll Out NCR Web Kiosks in New Design Convenience Stores PR Newswire. New York: Jan. 19, 2001. p. 1.*
Corporates & e-banking Priyanka Jayashankar. Businessline. Chennai: Oct. 30, 2004. p. 1.*

* cited by examiner

Primary Examiner—Lalita M Hamilton
(74) Attorney, Agent, or Firm—Henry B. Ward, III; Moore & Van Allen, PLLC

(57) ABSTRACT

A system, method, and computer program product is provided that is capable of receiving and processing payments from a payor. In one embodiment, the system includes a processing element capable of identifying a payor account, the payor account being associated with a payor and with one of a plurality of billers, and the payor account comprising payor account data. The processing element also is capable of accessing the payor account data. The processing element also is capable of receiving data representing a payment from the payor to satisfy a financial obligation evidenced by the payor account. The processing element is further capable of sending a notice to the one of a plurality of billers indicating that the payment has been received.

45 Claims, 4 Drawing Sheets

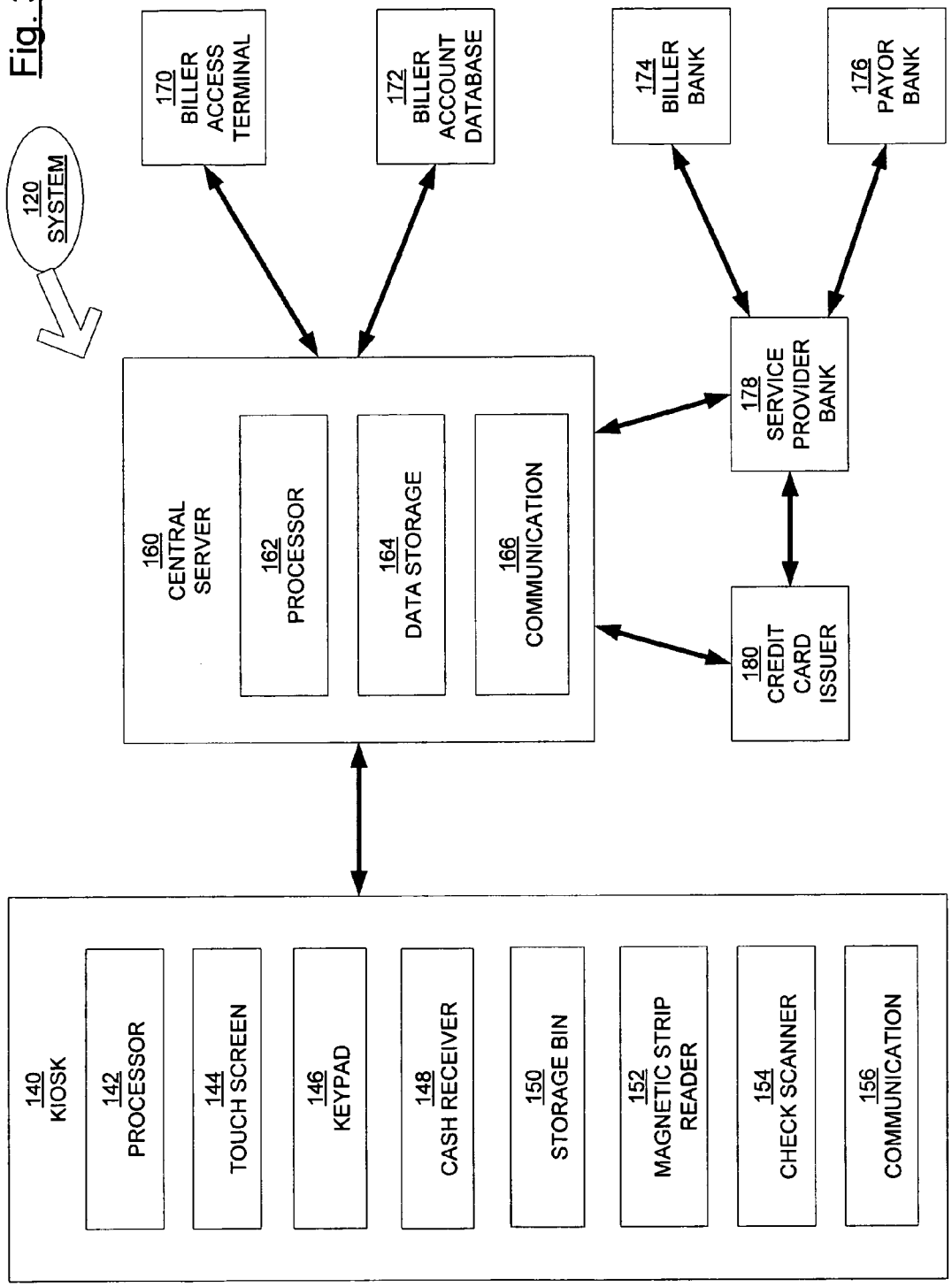

SYSTEM, METHOD, AND COMPUTER PROGRAM PRODUCT FOR RECEIVING AND PROCESSING PAYMENTS

CROSS-REFERENCE TO RELATED APPLICATIONS

This application claims the benefit of U.S. Provisional Application Ser. No. 60/640,923, filed Dec. 31, 2004.

FIELD OF THE INVENTION

The present invention relates generally to receiving and processing payments, and more particularly, to systems, methods, and computer program products for receiving payments via an interactive customer interface.

BACKGROUND OF THE INVENTION

Receiving and processing payments for services rendered is critical to the financial health of any business. This is especially true for businesses that provide ongoing or recurring services and bill their customers on a periodic basis (such as monthly) for those services. Examples of these types of businesses include alarm service provides, electric service providers, telephone service providers, Internet service providers, cable television service providers, and natural gas service providers.

While receiving and processing payments for services is a necessary and important activity for these businesses, it is also a costly and time-consuming activity. Conventional payment receiving and processing methods typically require customers to mail their payments to a central receiving location, sometimes referred to as a lockbox operation. These central receiving locations are often affiliated with a bank or other financial service provider. Customers mail in the remittance stub they receive from the business, along with a form of payment. The form of payment may be a personal check, a bank check, a money order, or possibly a credit card authorization. The central receiving location opens the received mail, electronically scans the payment to record the information, and then deposits the checks or money orders in the business's bank account, or processes a credit card charge. The payment information, known as remittance advice, may comprise the customer name and address, the account number, and the payment amount and date. The payment information is electronically compiled and periodically transmitted in a data file to the business.

While conventional lockbox operations are widely utilized, there are several drawbacks to this system. One drawback is the time it takes to complete the payment cycle. The cycle begins when payment is sent from the customer to the central receiving location, typically via the U.S. Postal Service. The transit time for the payment will typically be two to three days. The payment must then be removed from the envelope and scanned. The check must then be deposited. After the check is deposited, it may take a week for the money to be received by the business from the customer's bank. It is also possible that the U.S. Postal Service may misdirect the payment, thereby further delaying receipt and processing of the payment.

Another drawback of conventional lockbox operations is the requirement for the customer to send payment in the form of a check or a credit card authorization. Most businesses strongly discourage customers from sending cash because it may easily be lost or stolen during processing of the payment. In addition, many customers, particularly those with low incomes, do not have checking accounts or credit cards. These individuals must purchase a money order as their method of payment. However, money orders can be expensive and inconvenient to obtain.

The delay in receiving and processing payments from low-income customers can also be a problem for businesses since low-income customers sometimes delay sending payments as long as possible because of lack of money. Sometimes the customer may delay sending the payment until right before the service is to be terminated for lack of payment. If the customer waits too long, or if the mail is misdirected, this delay may cause the payment to be received late, which may in turn cause the business to terminate the service it is providing to the customer resulting in either the customer or the business having to incur the expense associated with reconnecting the service.

An alternative system of payment receiving and processing involves on-line bill payment. In one version of an on-line bill payment system, the customer accesses the customer's account via the business's Internet site. The customer may then provide payment directly to the business by authorizing a credit card payment, or by providing checking account information that will allow the business to request and receive payment electronically from the customer's bank. In another version of an on-line bill payment system, the customer accesses the customer's bank account via the bank's Internet site. The customer may then authorize the customer's bank to send a payment electronically directly to the business's bank account.

The on-line bill payment system addresses some of the drawbacks of conventional lockbox operations. However, the on-line bill payment system still requires the customer to have a bank account or a credit card. Additionally, the customer must have Internet access. Therefore, the on-line bill payment system may not be a suitable solution for some low-income customers.

Another alternative system of payment receiving and processing involves in-person bill payment. In such an in-person payment system, the customer must go to a specified location and tender payment. This may involve the customer going to the location of the business whose bill is to be paid or to an in-person service center operated by the business; for example, going to the office of the electric service provider to pay the bill for the electric service. This method allows the customer to pay using a variety of payment methods, including cash. However, the location of the business or the in-person service center operated by the business may be far from the location of the customer, thereby making it infeasible or undesirable for the customer to travel to the location of the business or in-person service center. In addition, operating such in-person service centers for receipt and processing of payments can be expensive for the business thereby decreasing what may already be a relatively small profit margin.

In some in-person payment receiving and processing systems, the payment may be tendered to a third party, who then forwards the payment to the appropriate business. A given third party may accept payments for numerous different businesses. These third parties are often grocery stores. These third parties accept these payments as a convenience to their customers (i.e., the customer may be located closer to the third party than the business or in-person service center and, thus, more convenient for the customers) and also because the third party receives a fee for every payment accepted (i.e., a commission). Additionally, a few states require by law that grocery stores accept payments for utility bills. This type of in-person bill payment system has the advantage that the cost associated with collecting the payments is less than the business operating its own in-person service center, since the cost is split among all of the business utilizing the third party's collection services. However, a drawback to this type of in-person bill payment system is that it requires an employee of the third party to accept the payment. This prevents this employee from performing the employee's main duties during the time the employee is accepting payments. Because of this, the third parties demand a larger commission than would be demanded if accepting the payment did not require use of the third parties' employees. Additionally, the employee accepting the payment must record the payment. It is possible that the employee could make a mistake while recording the payment and that could prevent the customer's account from being properly credited. Also, the payments received by the third party must be transferred to the appropriate business, thereby delaying the business' receipt of the remittance advice and money. The delay caused by the processing time for paper checks is also inherent in this system.

Another alternative system for receiving and processing payments involves an interactive customer interface, such as a kiosk. Examples of these systems are described in U.S. Pat. No. 5,616,902 to Cooley et al., U.S. Patent Application Publication No. 2002/0152165 to Dutta et al., which was published on Oct. 17, 2002, and U.S. Patent Application Publication No. 2003/0097332 to Golasinski et al., which was published on May 22, 2003. There are many benefits to an interactive customer interface system for receiving and processing payments. Such a system may allow several different forms of payment, such as cash, credit card, debit card, or check. Additionally, using such a system allows a customer to avoid the delay inherent in sending a payment by mail. Such systems, in the form of kiosks, may be placed in a variety of locations, such as retail stores, allowing them to be conveniently located near customers. Such systems may be capable of accepting payments for a variety of different businesses. Such systems also allow payments to be accepted without requiring any action by an employee of the retail store where the kiosk is located.

While these interactive customer interface systems provide a number of benefits, these systems do not provide either the customer or business real-time access to customer account information or access to a customer's payment history. As such, the customer generally must know the balance due and the payment due date to make a payment. Additionally, the customer may be required to physically possess the bill when making a payment, as these systems may require that the bill be scanned. These conventional interactive customer interface systems also must be periodically monitored by the business to remove payments and/or confirm operation of the interface, which can be an inefficient use of an employee's time (particularly, where the interface has room for additional payments and/or is operating fine). In addition, while such interfaces provide a more efficient system for collecting payments in comparison to other conventional in-person payment systems, such systems do not assist the business in selling or expanding its service offering to customers as perhaps would be done by an employee in an in-person service center.

As such, there remains a need for a system, method, and computer program product for receiving and processing payments whereby a customer can make a payment to a variety of businesses at any one of a variety of locations using a variety of payment options, whereby the customer has real-time access to account information, and whereby the businesses have real-time access to the payment information. In addition, the system, method, and computer program product for receiving and processing payments should assist the business in selling or expanding its service offering to customers.

BRIEF SUMMARY OF THE INVENTION

The present invention provides a system that is capable of receiving and processing payments from a customer (also referred to herein as a "payor" or "user") to one or more businesses (also referred to herein as "billers"). According to one embodiment, the system includes a processing element capable of identifying a payor account, wherein the payor account is associated with a payor and with one of a plurality of billers, and wherein the payor account comprises payor account data. In one embodiment, the processing element is capable of identifying a payor account by proposing to the payor a plurality of biller categories, wherein each one of the plurality of billers is associated with at least one of the plurality of biller categories. The processing element is capable of receiving data representing the one of a plurality of biller categories selected by the payor and is capable of proposing to the payor at least one biller associated with the selected one of the plurality of biller categories. The processing element is capable of receiving data representing the biller selected by the payor. The processing element is capable of receiving data representing a personal account identifier associated with the payor account, and wherein the processing element is also capable of verifying the account identifier. In one embodiment, the processing element is capable of verifying the account identifier by at least one of using a verification algorithm associated with the biller selected by the payor or matching verifying data against the payor account data.

The processing element is capable of accessing the payor account data. In one embodiment, the payor account data includes an amount due, a payment due date, the amount of prior payments, and/or the dates of prior payments. In another embodiment, the processing element is capable of at least one of accessing the payor account data from a data cache received periodically from the one of a plurality of billers or receiving the payor account data in real-time from the one of a plurality of billers.

The processing element is capable of receiving data representing a payment from the payor to satisfy a financial obligation evidenced by the payor account. The processing element is capable of sending a notice to the one of a plurality of billers indicating that the payment has been received. In one embodiment, the processing element is capable of sending a notice to the one of a plurality of billers by at least one of periodically sending batch payment data to the one of a plurality of billers or sending real-time payment data for each payor to the one of a plurality of billers when the payment is received. In another embodiment, the processing element is capable of sending a notice to the one of a plurality of billers upon receipt of a payment from a payor in a predefined subset of payors. In still another embodiment, the processing element is capable of processing the payment by sending instructions to transfer funds in an amount equal to the payment from the payor to a bank account of the one of a plurality of billers.

In another embodiment of the present invention, the processing element is capable of enforcing a payor-specific payment limitation. For example, in one embodiment, the payor-specific payment limitation specifies that the payment must be in paper currency.

In another embodiment of the present invention, the processing element is capable of proposing to the payor at least one of a plurality of targeted messages, wherein the at least one of a plurality of targeted messages that is proposed is determined based upon at least one of a plurality of attributes. For example, in one embodiment, the at least one of a plurality of attributes includes the date the payment is received in relation to the date the payment is due, payor account data, the one of a plurality of billers, or one of a plurality of biller categories. In one embodiment, the at least one of a plurality of targeted messages includes an offer to the payor to subscribe to a service option from the one of a plurality of billers to which the payor does not currently subscribe. In another embodiment, the processing element is capable of receiving the payor's acceptance of the subscription offer, and wherein the processing element is further capable of sending a notice to the one of a plurality of billers indicating the payor's acceptance.

In still another embodiment of the present invention, the processing element is capable of counting the paper currency received in a receptacle from the payor to determine the amount of paper currency received from the payor, wherein the receptacle has a maximum capacity of paper currency that can be received. The processing element is further capable of calculating a capacity percentage, wherein the capacity percentage is equal to the amount of paper currency received in the receptacle divided by the maximum capacity of paper currency that can be received in the receptacle. In one embodiment, the processing element is capable of sending a notification when the capacity percentage reaches a predefined value. In another embodiment, the processing element is capable of storing data representing the capacity percentage as a function of elapsed time. The processing element also is capable of estimating, based at least in part upon the stored data, the amount of time that will elapse before the capacity percentage will reach a predefined value, and wherein the processing element is further capable of sending a notification based upon the estimated elapsed time.

The present invention also provides a computer program product for processing payments from a payor to a biller, the computer program product comprises a computer-readable storage medium having computer-readable program code portions stored therein. In one embodiment, the computer-readable program code portions comprise an executable portion for identifying a payor account, the payor account being associated with a payor and with one of a plurality of billers, and wherein the payor account comprises payor account data. In one embodiment, the executable portion identifies the payor account by proposing to the payor a plurality of biller categories, wherein each one of the plurality of billers is associated with at least one of the plurality of biller categories. The executable portion receives data representing the one of the plurality of biller categories selected by the payor. The executable portion proposes to the payor at least one biller associated with the selected one of the plurality of biller categories. The executable portion receives data representing the biller selected by the payor. The executable portion receives data representing an account identifier associated with the payor account, and wherein the executable portion verifies the account identifier. In one embodiment, the executable portion verifies the account identifier by at least one of using a verification algorithm associated with the biller selected by the payor or matching verifying data against the payor account data.

The executable portion accesses the payor account data. In one embodiment, the payor account data includes an amount due, a payment due date, the amount of prior payments, and/or the dates of prior payments. In another embodiment, the executable portion accesses the payor account data by at least one of accessing a data cache received periodically from the one of a plurality of billers or receiving the payor account data in real-time from the one of a plurality of billers.

The executable portion receives data representing a payment from the payor to satisfy a financial obligation evidenced by the payor account. The executable portion sends a notice to the one of a plurality of billers indicating that the payment has been received. In one embodiment, the executable portion sends the notice by at least one of periodically sending batch payment data for a plurality of payors to the one of a plurality of billers or sending real-time payment data for each payor to the one of a plurality of billers when the payment is received. In another embodiment, the executable portion sends the notice upon receipt of a payment from a payor in a predefined subset of payors. In still another embodiment, the executable portion processes the payment by sending instructions to transfer funds in an amount equal to the payment from the payor to a bank account of the one of a plurality of billers.

In another embodiment of the present invention, the executable portion enforces a payor-specific payment limitation. For example, in one embodiment, the payor-specific payment limitation specifies that the payment must be in paper currency.

In another embodiment of the present invention, the executable portion proposes to the payor at least one of a plurality of targeted messages, wherein the at least one of a plurality of targeted messages that is proposed is determined based upon at least one of a plurality of attributes. For example, in one embodiment, the at least one of a plurality of attributes includes the date the payment is received in relation to the date the payment is due, payor account data, the one of a plurality of billers, or one of a plurality of biller categories. In one embodiment, the at least one of a plurality of targeted messages includes an offer to the payor to subscribe to a service option from the one of a plurality of billers to which the payor does not currently subscribe. In another embodiment, the executable portion receives the payor's acceptance of the subscription offer, and wherein the executable portion sends a notice to the one of a plurality of billers indicating the payor's acceptance.

In still another embodiment of the present invention, the executable portion counts the paper currency received in a receptacle from the payor to determine the amount of paper currency received from the payor, wherein the receptacle has a maximum capacity of paper currency that can be received. The executable portion calculates a capacity percentage, wherein the capacity percentage is equal to the amount of paper currency received in the receptacle divided by the maximum capacity of paper currency that can be received in the receptacle. In one embodiment, the executable portion sends a notification when the capacity percentage reaches a predefined value. In another embodiment, the executable portion stores data representing the capacity percentage as a function of elapsed time. The executable portion estimates, based at least in part upon the stored data, the amount of time that will elapse before the capacity percentage will reach a predefined value, and wherein the executable portion sends a notification based upon the estimated elapsed time.

The present invention also provides a method for receiving and processing payments from a payor to a biller. According to one embodiment, the method includes identifying a payor account, the payor account being associated with a payor and with one of a plurality of billers, and wherein the payor account comprises payor account data. In one embodiment, the identifying step includes proposing to the payor a plurality of biller categories, wherein each one of the plurality of billers is associated with at least one of the plurality of biller categories. The identifying step includes receiving data representing the one of the plurality of biller categories selected by the payor. The identifying step includes proposing to the payor at least one biller associated with the selected one of the plurality of biller categories. The identifying step includes receiving data representing the biller selected by the payor, receiving data representing an account identifier associated with the payor account, and verifying the account identifier. In one embodiment, the verifying step comprises at least one of using a verification algorithm associated with the biller selected by the payor or matching verifying data against the payor account data.

The method for receiving and processing payments from a payor to a biller includes accessing the payor account data. In one embodiment, the payor account data includes an amount due, a payment due date, the amount of prior payments and/or the dates of prior payments. In another embodiment, the accessing step includes at least one of accessing the payor account data from a data cache received periodically from the one of a plurality of billers or receiving the payor account data in real-time from the one of a plurality of billers.

The method for receiving and processing payments from a payor to a biller includes receiving a payment from the payor to satisfy a financial obligation evidenced by the payor account. The method includes sending a notice to the one of a plurality of billers indicating that the payment has been received and processing the payment. In one embodiment, the sending step comprises at least one of periodically sending batch payment data for a plurality of payors to the one of a plurality of billers or sending real-time payment data for each payor to the one of a plurality of billers when the payment is received. In another embodiment, the sending step is performed upon receipt of a payment from a payor in a predefined subset of payors. In one embodiment, the processing step comprises sending instructions to transfer funds in an amount equal to the payment from the payor to a bank account of the one of a plurality of billers.

In another embodiment, the method for receiving and processing payments includes enforcing a payor-specific payment limitation. For example, in one embodiment, the payor-specific payment limitation specifies that the payment must be in paper currency.

In another embodiment of the present invention, the method includes proposing to the payor at least one of a plurality of targeted messages, wherein the at least one of a plurality of targeted messages that is proposed is determined based upon at least one of a plurality of attributes. For example, in one embodiment, the at least one of a plurality of attributes includes the date the payment is received in relation to the date the payment is due, payor account data, the one of a plurality of billers, or one of a plurality of biller categories. In one embodiment, the at least one of a plurality of targeted messages comprises an offer to the payor to subscribe to a service option from the one of a plurality of billers to which the payor does not currently subscribe. In another embodiment, the method includes receiving the payor's acceptance of the subscription offer and sending a notice to the one of a plurality of billers indicating the payor's acceptance.

In still another embodiment of the present invention, the method includes counting the paper currency received in a receptacle from the payor to determine the amount of paper currency received from the payor, wherein the receptacle has a maximum capacity of paper currency that can be deposited. The method includes calculating a capacity percentage, wherein the capacity percentage is equal to the amount of paper currency received in the receptacle divided by the maximum capacity of paper currency that can be received in the receptacle. In one embodiment, the method includes sending a notification when the capacity percentage reaches a predefined value. In another embodiment, the method includes storing data representing the capacity percentage as a function of elapsed time; estimating, based at least in part upon the stored data, the amount of time that will elapse before the capacity percentage will reach a predefined value; and sending a notification based upon the estimated elapsed time.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a schematic block diagram of system for receiving and processing payments, according to one embodiment of the present invention.

DETAILED DESCRIPTION OF THE INVENTION

Figure 1A:
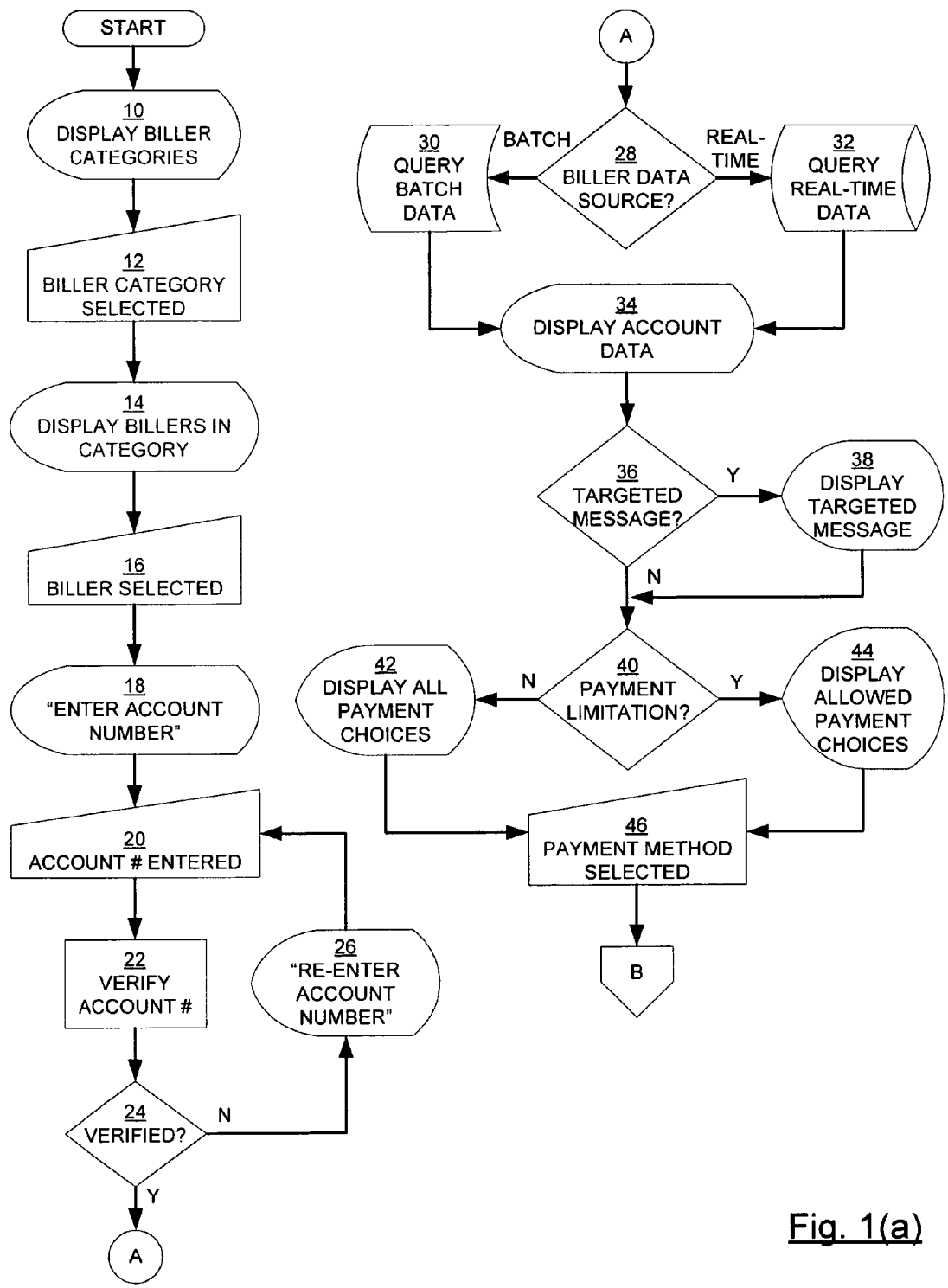
FIG. 1(a) is a flowchart of a method used in receiving payments from a payor to a biller, according to one embodiment of the present invention.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

While embodiments of the present invention will be described in terms of a system of kiosks and related infrastructure capable of receiving and processing payments (referred to herein generally as system 120), it should be appreciated that the present invention may be used with any interactive customer interface capable of receiving and processing payments. Interactive customer interfaces capable of receiving and processing payments exist in many forms and include, but are not limited to, Internet applications, automated telephonic applications such as an Interactive Voice Response (IVR) systems, and live telephonic applications such as a customer service call centers.

Referring to FIG. 3, there is illustrated a schematic block diagram of a system 120 for receiving and processing payments, according to one embodiment of the present invention. In the exemplary system 120 of FIG. 3, the kiosk 140 comprises a processor 142, a touch screen 144, a keypad 146, a cash receiver 148, a storage bin 150, a magnetic strip reader 152, a check scanner 154, and a communication element 156. As discussed more fully below, the processor 142 of the kiosk 140 controls the functions of the other elements of the kiosk 140. In addition, the processor 142 can also function as a verification element wherein it verifies the account identifier entered by the payor, e.g., using the biller's verification algorithm. The processor 142 can also function as a counting element wherein it counts the paper currency as it is received in the storage bin 150. The processor 142 can also function as a calculating element wherein it calculates the capacity percentage of the storage bin 150, as discussed more fully below.

The kiosk 140 includes a touch screen 144 that functions as a display element. In this regard, messages to the payor, such as "Enter Account Number," targeted messages, the payor's account data, etc., can be displayed on the touch screen 144 by the processor 142. The touch screen 144 and the keypad 146 are also capable of functioning as selection elements whereby selections, such as the biller category and the payment method, can be made by the payor by touching the corresponding portion of touch screen or entering a response via the keypad. The touch screen 144 and the keypad 146 are also capable of functioning as data entry elements through which the payor can enter data such as an account number or the amount of a payment being made by the payor.

The cash receiver 148, magnetic strip reader 152, and check scanner 154 are all capable of functioning as receiving elements to receive a payment from a payor. The cash receiver 148 receives paper currency if the payor is submitting a payment in cash. The paper currency submitted as payment is placed in storage bin 150, which holds the currency until the kiosk 140 can be serviced (for example, by an armored car service) at which time storage bin 150 is emptied. The magnetic strip reader 152 is used by the payor to swipe a credit card, such that the credit card data is read from the magnetic strip. The check scanner 154 receives a blank check if the payor is submitting a payment by check, and reads the account number and routing number from the check.

The communication element 156 functions as a data retrieval element and manages all communication between the kiosk 140 and the network server 160. In this regard, the communication element 156 is in communication (via the Internet, a local area network, a wide area network, etc.) with communication element 166 of the network server 160 to send and receive payor account data and payment data.

In the exemplary system of FIG. 3, the network server 160 comprises a processor 162, data storage 164, and a communication element 166. The processor 162 controls the functions of the other elements of the network server 160. In addition, the processor 162 can also function as a prediction element, such that in one embodiment of the invention the processor analyzes past usage of a kiosk 140, along with the current capacity percentage and information about upcoming anticipated heavy usage, to predict at which point in time storage bin 150 of the kiosk is likely to reach full capacity.

The communication element 166 manages all communication between the network server 160 and other devices both internal and external to the payment receiving and processing system 120. The network server 160 communicates, through communication element 166, with kiosk 140, biller access terminal 170, biller account database 172, credit card issuer 180, and service provider bank 178.

The data storage element 164 of the network server 160 stores the payor account data for those billers who transmit the data periodically in a batch file to the network server 160. The payor account data batch file is sent to the network server 160 from biller account database 172. The payor account data for a particular payor can be accessed from data storage element 164 when such account data is requested by a kiosk 140. For those billers who are capable of providing payor account data in response to real-time queries, payor account data for a particular payor is requested by the kiosk 140 (through the network server 160) from the biller account database 172 when such account data is requested from the kiosk 140 by the payor. In such a situation, the payor account data can be transmitted from biller account database 172 through network server 160 and to kiosk 140 without being stored in data storage element 164.

When a payment has been received and processed, the network server 160 sends the payment information to the biller account database 172, either periodically in a batch file or in real-time when the payment is processed. A payment history for payments received by the kiosks 140 for each biller can be stored in the data storage element 164. A biller is able to view this payment history in data storage element 164 using biller access terminal 170, which can communicate with the network server 160. The biller can view a particular payment to confirm the payment has been received from a particular payor, or the biller can generate ad hoc reports to review large amounts of payment data.

According to one embodiment of the present invention, when a credit card payment is processed, the network server 160 submits the credit card transaction to the credit card issuer 180. The credit card issuer 180 transmits payment to the service provider bank 178. When the payment is received by the service provider bank 178, the network server 160 instructs the service provider bank 178 to send the payment to the biller bank 174.

According to one embodiment of the present invention, when a check payment is processed, the network server 160 communicates with the service provider bank 178 to initiate an ACH transfer request. This ACH transfer request is sent to the payor bank 176. When the ACH transfer is received by the service provider bank 178, the network server 160 instructs the service provider bank 178 to send the payment to the biller bank 174.

According to one embodiment of the present invention, when a cash payment is processed by a kiosk 140, the network server 160 instructs the service provider bank 178 to send the payment to the biller bank 174.

In the exemplary system of FIG. 3, one kiosk 140 is shown in communication with one network server 160. It should be appreciated that the present invention contemplates the use of a plurality of kiosks 140, each at a separate physical location, and each in communication with one or more network servers 160. Additionally, as explained above, other interactive customer interfaces may be in communication with the network server(s) 160. In one embodiment of the invention, the payment receiving and processing system 120 of the present invention comprises a plurality of kiosks 140, which may be physically located in a variety of locations, and one or more network servers 160. The kiosks 140 may be located, for example, in retail establishments, such as grocery stores and convenience stores. To increase the convenience for customers needing to pay their bills, these kiosks 140 may be placed in a large number of different locations. The kiosks 140 are in communication over one or more network communication systems to the network server 160, such as via the Internet, a local area network, a wide area network, etc.

The payment receiving and processing system 120 of the present invention can be provided by a third-party service provider that is not affiliated with a particular business, or biller. This service provider can contract with a number of different billers to receive and process payments for the billers. For example, a service provider can receive and process payments for several utility and service companies, such as electric, water, natural gas, telecommunications, alarm, lawn care, pool care, insurance, loans, etc. Because the service provider is capable of receiving and processing payments for a number of different billers, a customer or "payor" can use the present invention to pay bills from several different billers. For example, a payor may use one kiosk 140 provided by the service provider to pay the payor's electric service bill, car insurance bill, and home mortgage.

The network server(s) 160 are in communication with the different billers (via the biller access terminals 170) over one or more communications networks, such as via the Internet, a local area network, a wide area network, etc. Each biller may provide account information to a network server 160 for all of the biller's customers via the biller account database 172. This account information for each customer can include, but is not limited to, the customer's name and address, an account identifier such as an account number, the current amount due as payment for the service provided, the payment due date, and any payment history (e.g., the dates and amounts of prior payments by this customer). This information may be provided by the biller in a batch file sent periodically at pre-defined intervals, such as once daily. Alternatively, this information may be sent by the biller real-time, in response to a query by the network server 160. The network server 160 may directly retrieve this information from the biller account database 172, if the biller's billing system is capable of allowing such direct retrieval of data.

When a payor desires to pay a bill received from one of the billers that has contracted with the service provider, the payor may utilize one of the kiosks 140 provided by the service provider. The payor may access the customer's account via the kiosk 140 in a number of ways. In one embodiment, the payor first selects a category of biller to which the particular biller belongs. Next, the payor selects the particular biller to be paid. The payor would then enter the account identifier corresponding to the payor's account with that particular biller (for example, using a numeric keypad 146). Alternatively, the kiosk 140 may have the capability to scan a card having a magnetic strip upon which is encoded information identifying the customer (for example, using the magnetic strip reader 152). When the payor enters an account identifier, the kiosk 140 will verify the account identifier using one of several potential methods (for example, a verification algorithm).

The kiosks 140 provided by the service provider are in communication with the network server 160 over one or more communications networks, such as via the Internet, a local area network, a wide area network, etc. In one embodiment, the kiosks 140 communicate with the network server 160 over a point-to-point frame relay. After the payor selects the biller to be paid and enters a verified account identifier, the kiosk 140 will typically request the account information corresponding to this biller and account identifier from the network server 160. As discussed above, this account information can be sent periodically in a batch file from the biller's biller account database 172 to the network server 160. In such an embodiment, the network server 160 accesses the account information from the batch file which is stored in the data storage 164 of the network server 160. Alternatively, when the kiosk 140 requests the account information, the network server 160 can obtain the account information real-time from the biller's billing system (i.e., biller access terminal 170 and biller account database 172).

The account information, which can include the amount currently due, the due date, and prior payment history, is displayed on the kiosk 140 (for example, the touch screen 144) for the payor to view. The payor may then elect to pay some or all of amount due. The kiosk 140 will accept payment using one or more payment options, including, but not limited to, cash, credit card, debit card, or check. The available payment methods can vary.

As discussed above, payment by cash entails the Payor depositing paper currency (i.e., bills), and possibly coins, into the kiosk 140. Payment by check typically entails using the kiosk 140 to scan a check to retrieve the account number and routing number, then the payor entering the amount of the payment desired. Payment by credit card typically involves using the kiosk 140 to read the magnetic strip on the credit card to retrieve the account number, then the payor entering the amount of the payment desired. Payment by debit card is typically similar to payment by credit card, but usually requires entering a password.

The network server 160 and/or a particular biller's account information may include customer specific payment limitations. For example, a particular biller may require that a particular payor pay by cash or credit card because a prior payment by check was returned for insufficient funds. Additionally, a particular payor may be prohibited from using the system 120 to pay any biller because of a pattern of improper payments to one or more billers. These improper payments, called returns, may be checks returned for insufficient funds, fraudulent credit card charges, or cancelled Automated Clearing House (ACH) transactions. The payment limitations may be set based on the number of returns a particular payor has had.

When the payor submits a payment to a kiosk 140, the payment information is transmitted over a communications network to the network server 160. The payment information can include the amount of the payment, the date and time the payment was made, the biller, and the payment method. The network server 160 transmits the payment information over a communications network to the corresponding biller. The payment information may be transmitted periodically in a batch file, or it may be transmitted in real-time as it is received by the network server 160. In one embodiment, the network server 160 may enter the payment information directly into the biller's billing system.

In addition to the payment information transmitted to the biller for entry into the biller's billing system, the network server 160 can provide notification to the biller in particular circumstances. For example, when the biller sends account information to the service provider, the biller may indicate those accounts for which service is scheduled to be terminated if payment is not received before the scheduled termination date. If payment is received for one of these indicated accounts, the service provider may be requested to send an additional notification, such as by e-mail or text message, to the biller's service dispatcher who can then cancel the service termination.

The biller may also have access to the payment information in the data storage 164 of the network server 160. The biller may be able to view payment information, such as by account or by the kiosk 140. This will allow the biller to verify a recent payment made by a customer. Additionally, the biller may be able to generate and download ad hoc reports from the data in the network server 160. Thus, the payor has real-time access to account information, and the businesses have real-time access to the payment information.

After the payment is received by the kiosk 140, the payment is typically applied to the payor's account at the corresponding biller. The process of applying the payment to the payor's account may vary depending on the method of payment. For example, if the payment is in cash, the amount of the payment may be aggregated with all other payments made that same day for that same biller, and the total amount may be electronically transferred from the service provider's bank account (at the service provider bank 178) to the biller's bank account (at the biller bank 174). If the payment is by check, an Automated Clearing House (ACH) transaction is typically created to electronically transfer the amount of the payment from the payor's bank account (at the payor bank 176) to the service provider's bank account. When that transfer is complete, then the service provider will typically electronically transfer the amount of the payment from the service provider's bank account to the biller's bank account. This may also be aggregated with other payments. If the payment is by credit card, the authorized charge is transmitted to the credit card issuer, and the credit card issuer electronically transmits the amount of the payment to the service provider's bank account. When that transfer is complete, then the service provider will typically electronically transfer the amount of the payment from the service provider's bank account to the biller's bank account.

While the payor is using the kiosk 140, targeted messages may be displayed on the kiosk (e.g., on the touch screen 144). These targeted messages can be transmitted over the communications network from the network server 160 to the kiosk 140 while the transaction is being conducted. These targeted messages may be advertisements (in a visual, aural, or audiovisual format) or may be information about the particular payor's account. The messages may be targeted based on one or more different aspects of the transaction. The messages may be targeted based on information about the particular payor, such as displaying an advertisement for a retail establishment that is located near the payor's home address.

When the payor is submitting a payment using cash, the paper currency is stored in a storage bin 150 within the kiosk 140. The processor 142 of the kiosk 140 will count the denomination of every bill accepted, along with the order in which each bill was accepted. This count facilitates verifying or disputing claims that a payment was incorrectly recorded. The processor 142 of the kiosk 140 can also count the number of bills accepted since the storage bin 150 was most recently emptied. Each storage bin 150 will have a maximum storage capacity, which varies by kiosk model, and which can be expressed as the total number of bills the storage bin is capable of storing. By dividing the maximum storage capacity by the number of bills accepted, the processor 142 of the kiosk 140 is capable of calculating how full the storage bin 150 is, expressed as a capacity percentage (e.g., 50% full). When the capacity percentage of a particular kiosk 140 reaches a predetermined threshold (e.g., 67%), the network server 160 may transmit a notification to an armored car service (over one or more communications networks, such as via the Internet, a local area network, a wide area network, etc.) requesting that the particular kiosk be serviced within a predefined period of time (e.g., 72 hours).

The network server 160 may also be capable of monitoring the supply of consumable materials used in the kiosk 140, such as paper and ink. The network server 160 may transmit a notification (over one or more communications networks, such as via the Internet, a local area network, a wide area network, etc.) to the appropriate personnel at the service provider or at a third-party servicing company to request replenishment.

In addition to the touch screen 144 used as a customer interface and to display targeted messages and account information to the payor, the kiosk 140 may have an auxiliary display screen and/or one or more speakers to display advertisements. The auxiliary display screen will typically be positioned so that it can be viewed by the payor and by other people who are near the kiosk 140. Because people other than the payor using the kiosk 140 can see the advertisements, these advertisements are typically not targeted to the particular payor. These advertisements may, however, be targeted to the particular geographic location of the kiosk 140, or to the nature of the retail establishment where the kiosk is located. The advertisements are typically transmitted from the network server 160 to the kiosk 140 during times of low usage of the kiosk, such as late at night, to avoid slowing other network transmissions that are related to payments.

In another embodiment of the invention, the network server 160 may host a secure website that is access controlled using passwords. Access to the secure website may be given to companies that provide maintenance and repair services for the kiosks 140. These companies may access the website to record the repair history of any kiosk 140. This repair history may also be used to build a knowledge base that other maintenance and repair companies can use to research a problem.

Figure 1B:
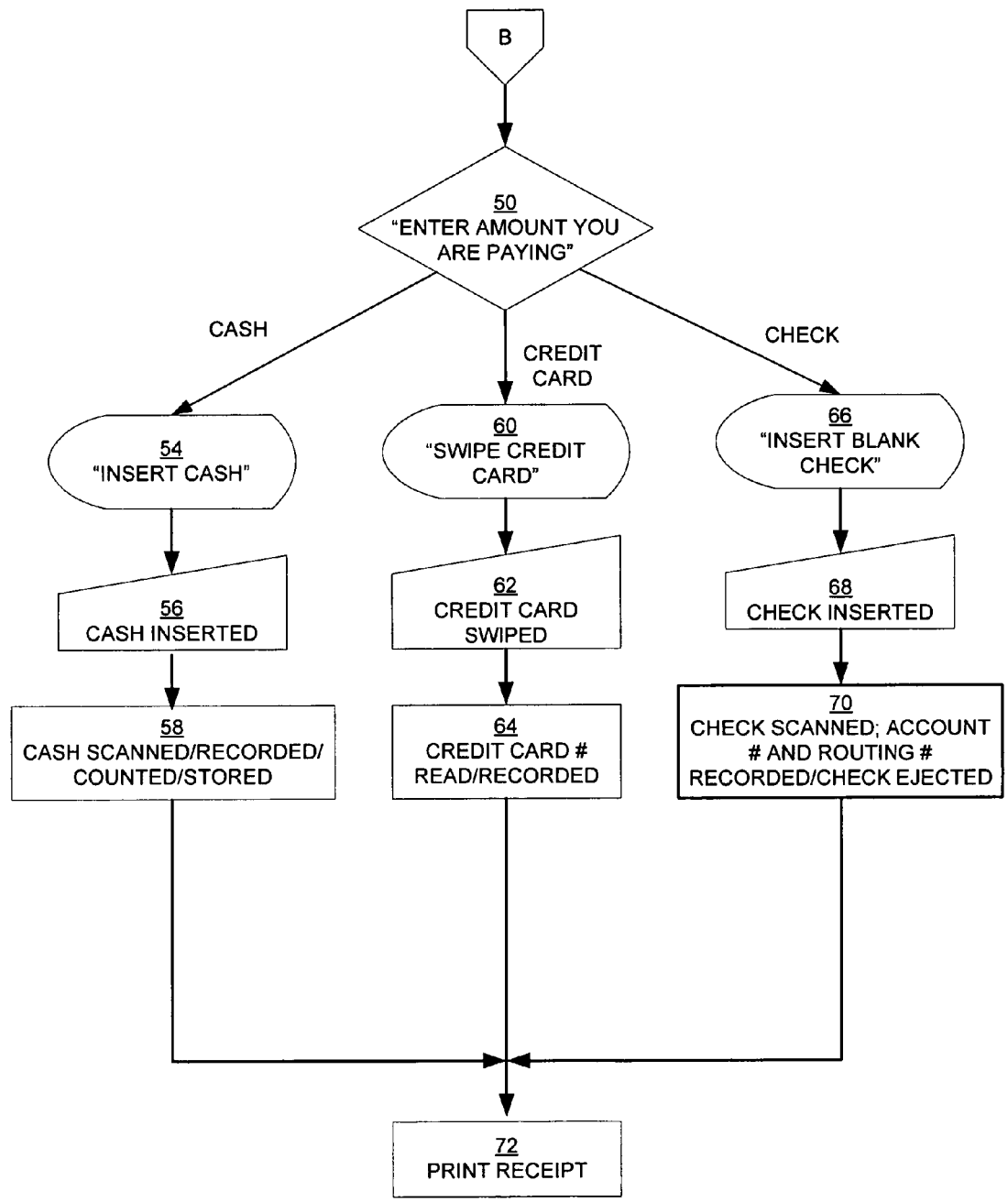
FIG. 1(b) is a continuation of the flowchart of FIG. 1(a)

Referring to FIGS. 1(*a*) and 1(*b*), there is illustrated a method used in receiving payments from a payor to a biller, according to one embodiment of the present invention. While embodiments of the present invention will be described in terms of a payment receiving and processing system utilizing a kiosk 140, it should be appreciated that the present invention may encompass a payment receiving and processing system utilizing any interactive customer interface.

The initial display presented on the kiosk to a payor who is using the kiosk to submit a payment may be a choice of biller categories from which the payor may select the category corresponding to the biller to be paid. See Block 10. Each biller is associated with at least one of a plurality of biller categories. The payor then selects the biller category using, for example, a touch screen or a numeric keypad. See Block 12. For example, if the payor desired to pay a bill from XYZ Electric Company, an electric service provider, the payor may select the "utilities" category. A list of one or more billers in the selected biller category would then be displayed on the kiosk (for example, the touch screen 144). See Block 14. This predetermined list would generally contain all the billers which have authorized the service provider to receive and process payments and which belong to or are associated with the selected biller category. The payor then selects the particular biller to whom the payor desires to send a payment. See Block 16. Again, this selection may be made using a touch screen or numeric keypad, or any other suitable device. It should be appreciated that presenting the billers to a payor for selection can be accomplished in a number of ways. For example, biller categories need not be used, rather the payor may only be presented an alphabetical list of billers from which to select. Alternatively, multiple levels of biller categories may be used. For example, to select a particular electric service provider, the payor may first select a biller category called "Utilities" and may next select a sub-category called "Electric Service Providers."

After the payor had selected the particular biller, the payor then provides an account identifier so that the payor's particular account data can be accessed. In one embodiment, this is accomplished by prompting the payor to enter the payor's account number corresponding to the payor's account with that particular biller. See Block 18. The payor would then enter the appropriate account number using a touch screen, a numeric keypad, a scanning device, or a full QWERTY keyboard. See Block 20. It should be appreciated that identifying the particular account number to access may be accomplished in a number of ways, other than by having the payor key in an account number. In one embodiment, the payor may be asked to slide ("swipe") a card having a magnetic strip, such as a credit card or, in some states, a driver's license, through a magnetic strip reader. The magnetic strip reader would determine the payor's identity using the information encoded on the magnetic strip and use that information to identify the particular account to access.

The account number entered by the payor would then be verified to assure that it was entered correctly. See Blocks 22 and 24. One verification method is to prompt the customer to enter the account identifier a second time and check that the same identifier was entered both times. Another method is to use a verification algorithm, if the biller has one. The biller's verification algorithm may require that the account identifier always have a predefined number of digits or always begin with a predefined number, or it may utilize a checksum. Another verification method is to require the payor to enter additional data that is compared to the account data, such as the last four digits of the payor's social security number or the payor's telephone number. If the account number provided by the payor is not valid (i. e., not verified), then the payor would be asked to re-enter the number. See Block 26.

After the account number entered by the payor has been verified, the data in the payor's account is accessed. In one embodiment of the invention, that may involve determining whether that particular biller provides account data to the service provider in a batch file or in response to real-time queries. See Block 28. If the biller provides account data periodically in a batch file, then that account data would typically be stored in a batch file in the data storage of the network server provided by the service provider. This batch file would be queried to retrieve the payor's account data. See Block 30. If the biller provides account data to the service provider on a real-time basis, then the kiosk would send a query which would typically be routed through the network server to the biller account database. See Block 32.

Whether the account data is obtained from a batch file or by real-time access to the biller account database, the account data will typically contain the current amount of money due to the biller from the payor (the "amount due"), the date by which the payor is expected to pay the amount due (the "due date"), and dates and amounts of prior payments the payor made to the biller. This account data is displayed on the kiosk (for example, on the touch screen) for the payor to view. See Block 34.

In one embodiment of the present invention, the method includes determining if a targeted message is to be displayed to the payor. See Block 36. The messages may be targeted based on information about the particular account, such as displaying an advertisement for a particular service option to which the payor does not currently subscribe. For example, a payor submitting a payment to a telephone service provider may be asked to subscribe to an optional service such as three-way calling. In one embodiment of the invention, the payor may be given the option of subscribing during the payment transaction, in which case the service provider would typically send a message to the biller notifying the biller of the payor's request. Another example would be displaying an advertisement for a payday loan provider to customers whose accounts indicate a past-due amount. Additionally, where an account may be scheduled for service termination, the kiosk could display a message informing the payor that a payment must be made within a specified time to avoid service termination. The messages may also be targeted based on information about the particular biller. For example, a payor submitting a payment to a natural gas utility company may be shown an advertisement for gas log fireplaces. If it is determined that a targeted message is to be displayed, it will be displayed to the payor (for example, on the touch screen or an auxiliary display). See Block 38. It should be appreciated that the targeted message may be displayed to the payor anytime after the payor's account has been identified.

The next step would typically be to determine if there is a payment limitation for this payor. See Block 40. A payment limitation may be set for a payor because, for example, the payor has had checks returned for insufficient funds. The payment limitation may limit the payment methods the payor is allowed to use. For example, the payor may only be allowed to make a payment using guaranteed funds, such as cash or a credit card. If there is such a payment limitation, then only those payment methods which the payor is allowed to use will be displayed to the payor. See Block 44. For example, if the payor is only allowed to make payments using guaranteed funds, then the option to pay by check will not be displayed. If there is no payment limitation for this payor, then all payment options supported by the kiosk will be displayed. See Block 42. For example, a kiosk may support payments by cash, credit card, debit card, or check. In a payment receiving and processing system using a different interactive customer interface, such as IVR, different payment options may be supported.

The payor then selects the payment method the payor desires to use for this payment from the displayed options. See Block 46. The payor then enters the amount of the payment to be submitted. See Block 50.

If the payor selected the option to pay in cash, several steps would typically be performed. First, the payor would be prompted to insert cash into the kiosk, see Block 54, and the payor would insert cash as prompted, see Block 56. Then, the kiosk would scan the cash to determine the denomination, record the amount of cash inserted, add to a running count of the number of bills received, and store the received cash in a receptacle or storage bin 150. See Block 58.

If the payor selects the option to pay by credit card, several different steps would typically be performed. First, the payor would be prompted to swipe a credit card in the kiosk's magnetic strip reader, see Block 60, which the payor would do, see Block 62. When the credit card is swiped, the kiosk reads and records the information encoded in the magnetic strip. See Block 64. A similar process is performed if the payor selects the option to pay by debit card, except that the kiosk would solicit the payor to provide the payor's security code for his/her account, as is provided when using an ATM.

If the payor selects the option to pay by check, several different steps would typically be performed. First, the payor would be prompted to insert a blank check into a check scanner in the kiosk, see Block 66, which the payor would do, see Block 68. When the check is inserted, the kiosk scans and records the account number and routing number on the check, then ejects the check to return it to the payor. See Block 70.

The final step in receiving the payment is typically printing a receipt for the payor. See Block 72. The receipt would typically include a unique transaction identifier, payment amount, type, fee, time and date, etc.

Figure 2:
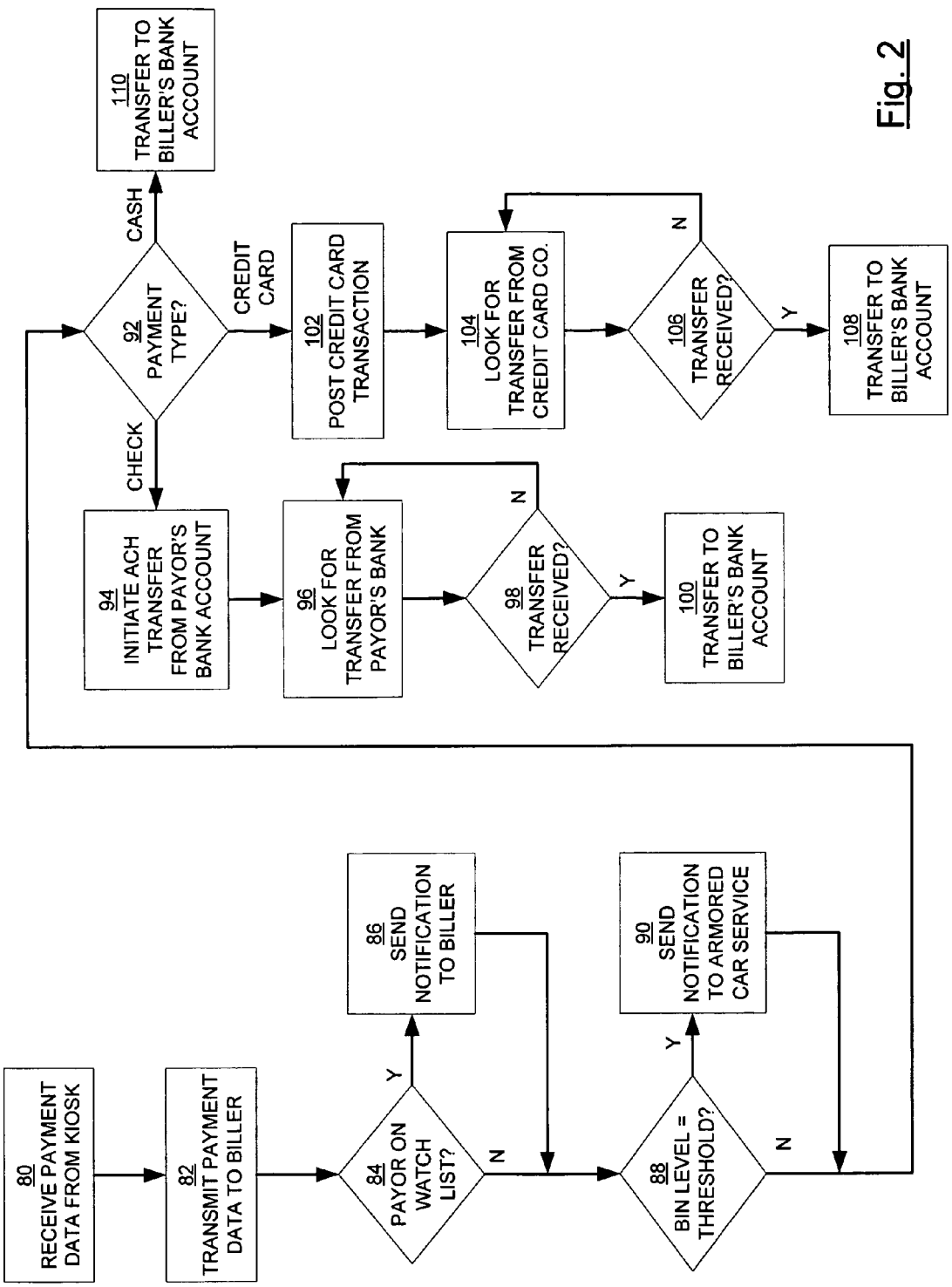
FIG. 2 is a flowchart of a method used in processing payments from a payor to a biller, according to one embodiment of the present invention.

Referring to FIG. 2, there is illustrated a method of processing a payment that has been received from a payor, according to one embodiment of the present invention. The method includes a network server receiving the payment data, see Block 80, that was transmitted by the kiosk. The payment data is transmitted to the appropriate biller. See Block 82. This transmission of the payment data to the biller may be accomplished in a number of different ways, depending on the capabilities of the biller. The payment data for a particular biller may be accumulated by the network server and transmitted to the biller periodically in a batch file. The biller may need to reformat the batch file to input the payment data into its billing system. Alternatively, the biller may need to manually enter the payment data into its billing system. The payment data for a particular biller may be transmitted real-time as it is received by the network server. This would result possibly in numerous transmissions each day. Again, this data may need to be reformatted to be input to the biller's billing system. If the biller's billing system has the capability, it is possible that the network server could directly input the payment data into the billing system. This would allow the payment data to be rapidly input and therefore accessed by the biller.

The method includes determining if the particular payor has been put on a watch list by the biller, which may cause the biller to be separately notified of any payments from this payor. See Block 84. A payor may be put on a watch list if the biller is planning on terminating the service it provides to the payor. The watch list would allow the biller to be quickly informed of a payment so the service termination can be cancelled. If the payor is determined to be on a watch list, then a separate notification is sent to the biller. See Block 86. For example, this separate notification may be an e-mail message or a text message, and it may be sent to the biller's service dispatcher.

In one embodiment, the method includes determining if the amount of cash in the kiosk's storage bin has reached a predefined threshold. See Block 88. When the capacity percentage of a particular kiosk reaches a predetermined threshold (e.g., 67%), the network server may transmit a notification to an armored car service requesting that the particular kiosk be serviced within a predefined period of time (e.g., 72 hours). See Block 90. The notification would be sent to an armored car service whose service area includes the location of the particular kiosk. This notification is typically sent by e-mail. If the capacity percentage of the particular kiosk reaches another, higher, predetermined threshold (e.g., 75%), then the network server will typically transmit a notification to personnel working for the service provider to ensure that the kiosk is serviced promptly.

In one embodiment, instead of calling for service at a predetermined capacity percentage threshold, the network server is capable of analyzing past usage of the kiosk to determine trends. Using this past trend information, along with the current capacity percentage and information about upcoming traditional paydays and distributions of government benefit checks, the network server is capable of predicting at which point in time the kiosk storage bin is likely to reach full capacity and calling for service of the kiosk a predetermined number of hours in advance of that point in time. For example, a particular kiosk may typically see a large amount of usage on the first and second days of the month, because the last day of the month is a traditional payday. If the first day of the month occurs in 72 hours, the network server may request service of that kiosk, even though it may only be 50% full, because of the upcoming predicted heavy usage.

The settlement process is typically conducted using ACH. A deposit is sent to the biller's financial institution for all payments. Any returned items from either a customer's bank or credit card issuer are included in the next day's settlement process.

According to one aspect of the present invention, all or a portion of the system of the present invention generally operate under control of a computer program product. The computer program product for performing the methods of embodiments of the present invention includes a computer-readable storage medium, such as a non-volatile storage medium, and computer-readable program code portions, such as a series of computer instructions, embodied in the computer-readable storage medium.

In this regard, FIGS. 1(*a*), 1(*b*), 2 and 3, are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for receiving and processing payments from a payor to a third-party biller, comprising:
 a processing element capable of identifying a payor account, the payor account being associated with a payor and with one of a plurality of third-party billers, and the payor account comprising payor account data, said processing element also is capable of accessing the payor account data collected and stored by the one of a plurality of third-party billers;
 a remote kiosk in operable communication with said processing element and structured to operate as an interface for the payor to input data;
 said processing element also being capable of receiving, through said remote kiosk, data representing a payment from the payor to satisfy a financial obligation evidenced by the payor account, and wherein said processing element is further capable of sending an electronic notice to the one of a plurality of third-party billers distinct from the payment indicating that the payment has been received.

2. The system according to claim 1 wherein said processing element is further capable of proposing to the payor a plurality of biller categories, wherein each one of the plurality of third-party billers is associated with at least one of the plurality of biller categories, said processing element being capable of receiving data representing the one of the plurality of biller categories selected by the payor, said processing element being capable of proposing to the payor at least one third-party biller associated with the selected one of the plurality of biller categories, said processing element being capable of receiving data representing the third-party biller selected by the payor, said processing element being capable of receiving data representing an account identifier associated with the payor account, and wherein said processing element is capable of verifying the account identifier.

3. The system according to claim 2 wherein said processing element is capable of verifying the account identifier by at least one of using a verification algorithm associated with the third-party biller selected by the payor or matching verifying data against the payor account data.

4. The system according to claim 1 wherein the payor account data comprises data representing information from the group consisting of an amount due, a payment due date, the amount of prior payments, and the dates of prior payments.

5. The system according to claim 1 wherein said processing element is capable of at least one of accessing the payor account data from a data cache received periodically from the one of a plurality of third-party billers or receiving the payor account data in real-time from the one of a plurality of third-party billers.

6. The system according to claim 1 wherein said processing element is capable of processing the payment by sending instructions to transfer funds in an amount equal to the payment from the payor to a bank account of the one of a plurality of third-party billers.

7. The system according to claim 1 wherein said processing element is capable of sending a notice to the one of a plurality of third-party billers by at least one of periodically sending batch payment data to the one of a plurality of third-party billers or sending real-time payment data for each payor to the one of a plurality of third-party billers when the payment is received.

8. The system according to claim 1 wherein said processing element is capable of sending a notice to the one of a plurality of third-party billers upon receipt of a payment from a payor in a predefined subset of payors.

9. The system according to claim 1 wherein said processing element is capable of enforcing a payor-specific payment limitation.

10. The system according to claim 9 wherein the payor-specific payment limitation specifies that the payment must be in paper currency.

11. The system according to claim 1 wherein said processing element is capable of proposing to the payor at least one of a plurality of targeted messages, wherein the at least one of a plurality of targeted messages that is proposed is determined based upon at least one of a plurality of attributes.

12. The system according to claim 11 wherein the at least one of a plurality of attributes is selected from the group consisting of the date the payment is received in relation to the date the payment is due, payor account data, the one of a plurality of third-party billers, and one of a plurality of biller categories.

13. The system according to claim 11 wherein the at least one of a plurality of targeted messages comprises an offer to the payor to subscribe to a service option from the one of a plurality of third-party billers to which the payor does not currently subscribe.

14. The system according to claim 13 wherein said processing element is capable of receiving the payor's acceptance of the subscription offer, and wherein said processing element is further capable of sending a notice to the one of a plurality of third-party billers indicating the payor's acceptance.

15. The system according to claim 1 wherein said processing element is capable of counting the paper currency received in a receptacle from the payor to determine the amount of paper currency received from the payor, the receptacle having a maximum capacity of paper currency that can be received, said processing element is further capable of calculating a capacity percentage, the capacity percentage being equal to the amount of paper currency received in the receptacle divided by the maximum capacity of paper currency that can be received.

16. The system according to claim 15 wherein said processing element is capable of sending a notification when the capacity percentage reaches a predefined value.

17. The system according to claim 15 wherein said processing element is capable of storing data representing the capacity percentage as a function of elapsed time, said processing element also being capable of estimating, based at least in part upon the stored data, the amount of time that will elapse before the capacity percentage will reach a predefined value, and wherein said processing element is further capable of sending a notification based upon the estimated elapsed time.

18. A computer program product for processing payments from a payor to a third-party biller, the computer program product comprising a computer-readable storage medium having computer-readable program code stored therein, the computer program product being in operable communication with a remote kiosk, the computer-readable program code comprising:

an executable portion for identifying a payor account, the payor account being associated with a payor and with one of a plurality of third-party billers, and the payor account comprising payor account data, said executable portion accesses the payor account data collected and stored by the one of a plurality of third-party billers, said executable portion receives, through the remote kiosk, data representing a payment from the payor to satisfy a financial obligation evidenced by the payor account, and said executable portion sends an electronic notice to the one of a plurality of third-party billers distinct from the payment indicating that the payment has been received.

19. The computer program product according to claim 18 wherein said executable portion identifies the payor account by proposing to the payor a plurality of biller categories, wherein each one of the plurality of third-party billers is associated with at least one of the plurality of biller categories, said executable portion receives data representing the one of the plurality of biller categories selected by the payor, said executable portion proposes to the payor at least one third-party biller associated with the selected one of the plurality of biller categories, said executable portion receives data representing the third-party biller selected by the payor, said executable portion receives data representing an account identifier associated with the payor account, and wherein said executable portion verifies the account identifier.

20. The computer program product according to claim 19 wherein said executable portion verifies the account identifier by at least one of using a verification algorithm associated with the third-party biller selected by the payor or matching verifying data against the payor account data.

21. The computer program product according to claim 18 wherein said executable portion accesses the payor account data by at least one of accessing a data cache received periodically from the one of a plurality of third-party billers or receiving the payor account data in real-time from the one of a plurality of third-party billers.

22. The computer program product according to claim 18 wherein said executable portion processes the payment by sending instructions to transfer funds in an amount equal to the payment from the payor to a bank account of the one of a plurality of third-party billers.

23. The computer program product according to claim 18 wherein said executable portion sends the notice by at least one of periodically sending batch payment data for a plurality of payors to the one of a plurality of third-party billers or sending real-time payment data for each payor to the one of a plurality of third-party billers when the payment is received.

24. The computer program product according to claim 18 wherein said executable portion sends the notice upon receipt of a payment from a payor in a predefined subset of payors.

25. The computer program product according to claim 18 wherein said executable portion enforces a payor-specific payment limitation.

26. The computer program product according to claim 18 wherein said executable portion proposes to the payor at least one of a plurality of targeted messages, wherein the at least one of a plurality of targeted messages that is proposed is determined based upon at least one of a plurality of attributes.

27. The computer program product according to claim 26 wherein the at least one of a plurality of targeted messages comprises an offer to the payor to subscribe to a service option from the one of a plurality of third-party billers to which the payor does not currently subscribe.

28. The computer program product according to claim 27 wherein said executable portion receives the payor's acceptance of the subscription offer, and wherein said executable portion sends a notice to the one of a plurality of third-party billers indicating the payor's acceptance.

29. The computer program product according to claim 18 wherein said executable portion counts the paper currency received in a receptacle from the payor to determine the amount of paper currency received from the payor, the receptacle having a maximum capacity of paper currency that can be received, and wherein said executable portion calculates a capacity percentage, the capacity percentage being equal to the amount of paper currency received in the receptacle divided by the maximum capacity of paper currency that can be received.

30. The computer program product according to claim 29 wherein said executable portion sends a notification when the capacity percentage reaches a predefined value.

31. The computer program product according to claim 29 wherein said executable portion storing data representing the capacity percentage as a function of elapsed time, said executable portion estimates, based at least in part upon the stored data, the amount of time that will elapse before the capacity percentage will reach a predefined value, and wherein said executable portion sends a notification based upon the estimated elapsed time.

32. A method of receiving and processing payments from a payor to a third-party biller, comprising:
identifying a payor account, the payor account being associated with a payor and with one of a plurality of third-party billers, and the payor account comprising payor account data;
accessing the payor account data collected and stored by the one of a plurality of third-party billers;
providing a remote kiosk in structured to operate as an interface for the payor to input data;
receiving a payment through the remote kiosk from the payor to satisfy a financial obligation evidenced by the payor account;
processing the payment; and
sending an electronic notice to the one of a plurality of third-party billers distinct from the payment indicating that the payment has been received.

33. The method according to claim 32 wherein said identifying step comprises:
proposing to the payor a plurality of biller categories, wherein each one of the plurality of third-party billers is associated with at least one of the plurality of biller categories;
receiving data representing the one of the plurality of biller categories selected by the payor;
proposing to the payor at least one third-party biller associated with the selected one of the plurality of biller categories;
receiving data representing the third-party biller selected by the payor;
receiving data representing an account identifier associated with the payor account; and
verifying the account identifier.

34. The method according to claim 33 wherein said verifying step comprises at least one of using a verification algorithm associated with the third-party biller selected by the payor or matching verifying data against the payor account data.

35. The method according to claim 32 wherein said accessing step comprises at least one of accessing the payor account data from a data cache received periodically from the one of a plurality of third-party billers or receiving the payor account data in real-time from the one of a plurality of third-party billers.

36. The method according to claim 32 wherein said processing step comprises sending instructions to transfer funds in an amount equal to the payment from the payor to a bank account of the one of a plurality of third-party billers.

37. The method according to claim 32 wherein said sending step comprises at least one of periodically sending batch payment data for a plurality of payors to the one of a plurality of third-party billers or sending real-time payment data for each payor to the one of a plurality of third-party billers when the payment is received.

38. The method according to claim 32 wherein said sending step is performed upon receipt of a payment from a payor in a predefined subset of payors.

39. The method according to claim 32 further comprising enforcing a payor-specific payment limitation.

40. The method according to claim 32 further comprising proposing to the payor at least one of a plurality of targeted messages, wherein the at least one of a plurality of targeted messages that is proposed is determined based upon at least one of a plurality of attributes.

41. The method according to claim 40 wherein the at least one of a plurality of targeted messages comprises an offer to the payor to subscribe to a service option from the one of a plurality of third-party billers to which the payor does not currently subscribe.

42. The method according to claim 41 further comprising:
receiving the payor's acceptance of the subscription offer; and
sends a notice to the one of a plurality of third-party billers indicating the payor's acceptance.

43. The method according to claim 32 further comprising:
counting the paper currency received in a receptacle from the payor to determine the amount of paper currency received from the payor, wherein the receptacle has a maximum capacity of paper currency that can be deposited; and
calculating a capacity percentage, the capacity percentage being equal to the amount of paper currency received in the receptacle divided by the maximum capacity of paper currency that can be received in the receptacle.

44. The method according to claim 43 further comprising sending a notification when the capacity percentage reaches a predefined value.

45. The method according to claim 43 further comprising:
storing data representing the capacity percentage as a function of elapsed time;

estimating, based at least in part upon the stored data, the amount of time that will elapse before the capacity percentage will reach a predefined value; and sending a notification based upon the estimated elapsed time.

* * * * *